United States Patent
Li

(10) Patent No.: US 9,178,811 B2
(45) Date of Patent: Nov. 3, 2015

(54) METHOD, APPARATUS AND SYSTEM FOR GENERATING LABEL FORWARDING TABLE ON RING TOPOLOGY

(71) Applicant: Huawei Technologies Co., Ltd., Shenzhen (CN)

(72) Inventor: Weifeng Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 108 days.

(21) Appl. No.: 14/198,187

(22) Filed: Mar. 5, 2014

(65) Prior Publication Data

US 2014/0204946 A1    Jul. 24, 2014

Related U.S. Application Data

(63) Continuation of application No. PCT/CN2011/079392, filed on Sep. 6, 2011.

(51) Int. Cl.
*H04L 12/723* (2013.01)
*H04L 12/433* (2006.01)

(52) U.S. Cl.
CPC ............ *H04L 45/50* (2013.01); *H04L 12/433* (2013.01); *H04L 45/507* (2013.01)

(58) Field of Classification Search
CPC ... H04L 12/437; H04L 41/0803; H04L 45/00; H04L 45/22; H04L 45/50; H04L 45/507; H04Q 11/0005; H04Q 2011/0024
See application file for complete search history.

(56) References Cited

U.S. PATENT DOCUMENTS

| | | |
|---|---|---|
| 2002/0172150 A1 | 11/2002 | Kano |
| 2007/0280251 A1* | 12/2007 | Wang et al. ................. 370/395.1 |
| 2009/0323521 A1 | 12/2009 | Tochio |
| 2012/0207017 A1* | 8/2012 | Ceccarelli et al. ............ 370/227 |
| 2014/0204946 A1* | 7/2014 | Li ................................. 370/392 |

FOREIGN PATENT DOCUMENTS

| | | |
|---|---|---|
| CN | 1761228 A | 4/2006 |
| CN | 1949766 A | 4/2007 |
| CN | 101155178 A | 4/2008 |
| EP | 1796328 A1 | 6/2007 |
| WO | 2008080418 A1 | 7/2008 |

OTHER PUBLICATIONS

Chinese Search Report of Patent Cooperation Treaty (PCT), Application No. PCT/CN2011/079392, dated Jun. 7, 2012, 11 pages.
Extended European Search Report, Application No. 11867145.2, Applicant Huawei Technologies Co., Ltd., date Jun. 23, 2014, 7 pages.
Rosen, E., et al., "Multiprotocol Label Switching Architecture," Network Working Group, Jan. 2001, 55 pages.

* cited by examiner

*Primary Examiner* — Raj Jain
(74) *Attorney, Agent, or Firm* — Slater & Matsil, L.L.P.

(57) ABSTRACT

Embodiments of the present invention provide a method for generating a label forwarding table for a non-destination router on a ring topology. Embodiments of the present invention further provide an apparatus for generating a label forwarding table for a non-destination router on a ring topology and a method and system for generating two label switching paths LSPs of different ring directions on a ring topology. Technical solutions provided by the embodiments of the present invention are based on a clockwise label forwarding table and a counterclockwise label forwarding table that are generated for each non-destination router on the ring topology. When it is found that traffic cannot be forwarded to a destination router by using one of the two label forwarding tables, the non-destination router performs traffic switching and uses the other label forwarding table to forward the traffic.

9 Claims, 12 Drawing Sheets

A non-destination router receives a clockwise outgoing label actively allocated by its clockwise next-hop router on the ring topology, where the clockwise outgoing label takes a destination router on the ring topology as an endpoint of a clockwise label switching path (LSP) corresponding to the clockwise outgoing label; preferably, the clockwise next-hop router on the ring topology allocates only one clockwise outgoing label to the non-destination router, where the label takes the destination router as the endpoint of the clockwise LSP; the clockwise outgoing label is a label carried in an LSP packet sent by the non-destination router along a clockwise direction ⟵ 202

The non-destination router receives a counterclockwise outgoing label actively allocated by its counterclockwise next-hop router on the ring topology, where the counterclockwise outgoing label takes the destination router on the ring topology as an endpoint of a counterclockwise LSP corresponding to the counterclockwise outgoing label, and the counterclockwise next-hop router on the ring topology allocates only one counterclockwise outgoing label to the non-destination router, and the label takes the destination router as the endpoint of the counterclockwise LSP ⟵ 204

The non-destination router actively allocates a clockwise incoming label of the non-destination router to its clockwise previous-hop router on the ring topology, where the clockwise incoming label takes the destination router as an endpoint of a clockwise LSP corresponding to the clockwise incoming label; preferably, the non-destination router allocates only one clockwise incoming label of the non-destination router to its clockwise previous-hop router on the ring topology; the clockwise incoming label is a label carried in an LSP packet received by the non-destination router along the clockwise direction ⟵ 206

CONT. FROM FIG. 2A

The non-destination router actively allocates a counterclockwise incoming label of the non-destination router to its counterclockwise previous-hop router on the ring topology, where the counterclockwise incoming label takes the destination router as an endpoint of a counterclockwise LSP corresponding to the counterclockwise incoming label; preferably, the non-destination router allocates only one counterclockwise incoming label of the non-destination router to its counterclockwise previous-hop router on the ring topology; the counterclockwise incoming label is a label carried in an LSP packet received by the non-destination router along a counterclockwise direction ⟵ 208

The non-destination router generates a clockwise label forwarding table according to the clockwise incoming label allocated by the non-destination router itself and the clockwise outgoing label received by the non-destination router itself, where the clockwise label forwarding table refers to a label forwarding table used for forwarding a data stream along the clockwise direction ⟵ 210

The non-destination router generates a counterclockwise label forwarding table according to the counterclockwise incoming label allocated by the non-destination router itself and the counterclockwise outgoing label received by the non-destination router itself, where the counterclockwise label forwarding table refers to a label forwarding table used for forwarding a data stream along the counterclockwise direction ⟵ 212

FIG. 2B

METHOD, APPARATUS AND SYSTEM FOR GENERATING LABEL FORWARDING TABLE ON RING TOPOLOGY

This application is a continuation of International Application No. PCT/CN2011/079392, filed on Sep. 6, 2011, which is hereby incorporated by reference in its entirety.

TECHNICAL FIELD

The present invention relates to multi-protocol label switching (MPLS), and in particular, to a label switching path (LSP) on a ring topology.

BACKGROUND

More and more telecom operators around the world are gradually migrating originally scattered and incompatible networks that adopt different technologies to unified network architecture based on the Internet protocol (IP) or multi-protocol label switching (MPLS) technology. With advantages such as being flexible and simple, topology-independent and connection-oriented, an IP/MPLS technical system is becoming a major service bearing manner adopted by the telecom operators in a network.

The IP/MPLS technical system mainly includes two parts, namely, a control layer and a forwarding layer. The control layer is mainly responsible for discovering an end-to-end route and establishing a path in a network, and the forwarding layer is mainly responsible for addressing and distributing of packets. Main protocols defined at the control layer include the open shortest path first (OSPF) protocol, the intermediate system to intermediate system (IS-IS) protocol, the label distribution protocol (LDP), the resource reservation protocol (RSVP), and so on. Main specifications defined at the forwarding layer include IP, MPLS and so on.

The MPLS uses a short label of a fixed length to an encapsulate network layer packet. Two important concepts in the MPLS are forwarding equivalence class (FEC) and label.

The MPLS is actually a class-based forwarding technology that classifies packets with a same forwarding processing manner (having a same destination, using a same forwarding path, and having a same service level) into one class, which is referred to as an FEC. Generally speaking, classification of a packet into an FEC is in accordance with its network layer destination address. Packets belonging to a same FEC get completely the same processing in an MPLS network.

A label is a short identifier that is of a fixed length and has a local meaning, and is used to identify an FEC. When packets arrive at ingress of the MPLS network, they are classified into different FECs according to a certain rule, and according to a FEC to which a packet belongs, a corresponding label is encapsulated in the packet. Therefore, in the network, the packet may be forwarded according to the label.

LDP is an important protocol at the control layer of the IP/MPLS architecture, and defines a mechanism and method for establishing a point-to-point LSP between two nodes along a shortest path. At present, the following situation may exist in an LSP established on a ring topology according to LDP: if a link fault occurs on the ring topology, packets are discarded, and such a packet loss process does not stop until a completely new LSP is established. The entire packet loss process generally lasts for a few seconds, which is unacceptable for a mobile voice service.

SUMMARY OF THE INVENTION

Embodiments of the present invention provide a method, an apparatus and a system for generating a label forwarding table on a ring topology, for generating, on a non-destination router, two label forwarding tables for forwarding a service in different directions.

An aspect of the present invention provides a method for generating a label forwarding table for a non-destination router on a ring topology, and the method includes receiving, by the non-destination router, a clockwise outgoing label actively allocated by its clockwise next-hop router on a ring topology. The clockwise outgoing label takes a destination router on the ring topology as an endpoint of a clockwise label switching path LSP corresponding to the clockwise outgoing label. The clockwise next-hop router on the ring topology allocates only one clockwise outgoing label to the non-destination router, and the label takes the destination router as the endpoint of the clockwise LSP. The non-destination router receives a counterclockwise outgoing label actively allocated by its counterclockwise next-hop router on the ring topology. The counterclockwise outgoing label takes the destination router on the ring topology as an endpoint of a counterclockwise LSP corresponding to the counterclockwise outgoing label. The counterclockwise next-hop router on the ring topology allocates only one counterclockwise outgoing label to the non-destination router, and the label takes the destination router as the endpoint of the counterclockwise LSP. The non-destination router actively allocates a clockwise incoming label of the non-destination router to its clockwise previous-hop router on the ring topology. The clockwise incoming label takes the destination router as an endpoint of a clockwise LSP corresponding to the clockwise incoming label, and the non-destination router allocates only one clockwise incoming label of the non-destination router to its clockwise previous-hop router on the ring topology. The non-destination router actively allocates a counterclockwise incoming label of the non-destination router to its counterclockwise previous-hop router on the ring topology. The counterclockwise incoming label takes the destination router as an endpoint of a counterclockwise LSP corresponding to the counterclockwise incoming label, and the non-destination router allocates only one counterclockwise incoming label of the non-destination router to its counterclockwise previous-hop router on the ring topology. The non-destination router generates a clockwise label forwarding table according to the clockwise incoming label allocated by the non-destination router itself and the clockwise outgoing label received by the non-destination router itself. The non-destination router generates a counterclockwise label forwarding table according to the counterclockwise incoming label allocated by the non-destination router itself and the counterclockwise outgoing label received by the non-destination router itself.

An aspect of the present invention provides a method for generating two label switching paths LSPs of different ring directions on a ring topology, and the method includes executing, by each non-destination router on a ring topology, a method for generating a label forwarding table for a non-destination router on a ring topology, to generate its own clockwise label forwarding table and counterclockwise label forwarding table on each non-destination router, so as to generate a clockwise LSP and a counterclockwise LSP in the ring topology and according to the clockwise label forwarding table and the counterclockwise label forwarding table of each non-destination router in the ring network, respectively, where the clockwise LSP and the counterclockwise LSP take a destination router as endpoints, and for any non-destination router, one of the clockwise LSP and the counterclockwise LSP is an active LSP, and the other is a standby LSP.

An aspect of the present invention provides an apparatus for generating a label forwarding table for a non-destination router on a ring topology, and the apparatus includes a clockwise outgoing label receiving unit configured to receive a clockwise outgoing label actively allocated by a clockwise next-hop router of a non-destination router where the apparatus is located on the ring topology. The clockwise outgoing label takes a destination router on the ring topology as an endpoint of a clockwise label switching path LSP corresponding to the clockwise outgoing label, the clockwise next-hop router on the ring topology allocates only one clockwise outgoing label to the non-destination router where the apparatus is located, and the label takes the destination router as the endpoint of the clockwise LSP. A counterclockwise outgoing label receiving unit is configured to receive a counterclockwise outgoing label actively allocated by a counterclockwise next-hop router of the non-destination router where the apparatus is located on the ring topology. The counterclockwise outgoing label takes the destination router on the ring topology as an endpoint of a counterclockwise LSP corresponding to the counterclockwise outgoing label, the counterclockwise next-hop router on the ring topology allocates only one counterclockwise outgoing label to the non-destination router where the apparatus is located, and the label takes the destination router as the endpoint of the counterclockwise LSP. A clockwise incoming label allocating unit is configured to actively allocate a clockwise incoming label of the non-destination router, where the apparatus is located, to a clockwise previous-hop router of the non-destination router where the apparatus is located on the ring topology, where the clockwise incoming label takes the destination router as an endpoint of a clockwise LSP corresponding to the clockwise incoming label, and the clockwise incoming label allocating unit allocates only one clockwise incoming label of the non-destination router, where the apparatus is located, to the clockwise previous-hop router of the non-destination router where the apparatus is located on the ring topology. A counterclockwise incoming label allocating unit is configured to actively allocate a counterclockwise incoming label of the non-destination router, where the apparatus is located, to a counterclockwise previous-hop router of the non-destination router where the apparatus is located on the ring topology, where the counterclockwise incoming label takes the destination router as an endpoint of a counterclockwise LSP corresponding to the counterclockwise incoming label, and the counterclockwise incoming label allocating unit allocates only one counterclockwise incoming label of the non-destination router, where the apparatus is located, to the counterclockwise previous-hop router to the non-destination router where the apparatus is located on the ring topology. A clockwise label forwarding table generating unit is configured to generate a clockwise label forwarding table according to the clockwise incoming label allocated by the clockwise incoming label allocating unit and the clockwise outgoing label received by the clockwise outgoing label receiving unit. A counterclockwise label forwarding table generating unit is configured to generate a counterclockwise label forwarding table according to the counterclockwise incoming label allocated by the counterclockwise incoming label allocating unit and the counterclockwise outgoing label received by the counterclockwise outgoing label receiving unit.

An aspect of the present invention provides a ring network system, where the system includes one destination router and multiple non-destination routers, and each non-destination router on the ring topology includes an apparatus for generating a label forwarding table.

In the embodiments of the present invention, a clockwise label forwarding table and a counterclockwise label forwarding table are generated on a non-destination router on the ring topology. When it is found that traffic cannot be forwarded to a destination router by using one label forwarding table of the two label forwarding tables, the non-destination router performs traffic switching and uses the other label forwarding table to forward the traffic. Because the other label forwarding table is established in advance, the traffic switching has a very high speed and does not cause loss of a great number of packets.

BRIEF DESCRIPTION OF THE DRAWINGS

FIGS. 2A and 2B shows a flow chart of a method according to an embodiment of the present invention;

Figure 1:
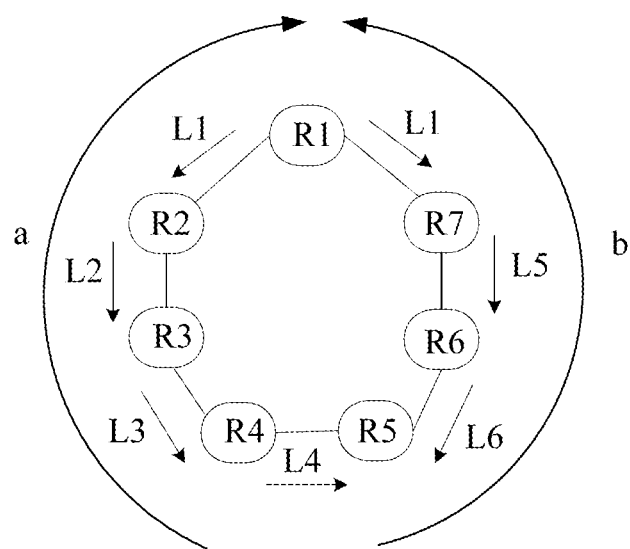
FIG. 1 illustrates a process of generating an LSP on a ring topology in the prior art.

The foregoing invention content and the following detailed descriptions of some embodiments of the present invention will be better understood with reference to the accompanying drawings. For a purpose of illustrating the present invention, some embodiments are shown in the drawings. However, it should be understood that the present invention is not limited to the arrangement and means shown in the accompanying drawings.

DETAILED DESCRIPTION OF ILLUSTRATIVE EMBODIMENTS

The following detailed illustration with reference to accompanying drawings is intended to illustrate various embodiments of the present invention, which does not indicate that the present invention can only be implemented as these embodiments. The detailed illustration includes specific details, so as to achieve a thorough understanding of the present invention. However, persons skilled in the art should understand that, implementation of the present invention may not use these specific details. In this specification, the term "ring topology" "ring networking" and "ring network" may be used interchangeably. Persons skilled in the art may understand that, in the ring networking, "insert" "copy" and "transit" are general technical terms in the field.

FIG. 1 illustrates a process of generating an LSP on a ring topology according to LDP. Seven routers represented by R1 to R7 are arranged along a counterclockwise direction on a ring topology.

For example, R1 is a destination router on the ring topology. It is assumed that traffic is separately inserted at the router R4 and the router R5. In order to generate an LSP to R1, before label allocation, route calculation is performed first. Optionally, optimal routes separately from R4 and R5 to the destination router R1 on the ring topology are calculated by using a routing protocol (such as OSPF) defined by the Internet engineer task force (IETF).

A calculated optimal route a from R4 to the destination router R1 is: R4→R3→R2→R1, and an optimal route b from R5 to R1 is: R5→R6→R7→R1.

The path a indicates that, an optimal next hop from R4 to the destination router R1 is R3, an optimal next hop from R3 to the destination router R1 is R2, and an optimal next hop from R2 to the destination router R1 is R1.

The path b indicates that, an optimal next hop from R5 to the destination router R1 is R6, an optimal next hop from R6 to the destination router R1 is R7, and an optimal next hop from R7 to the destination router R1 is R1.

After the route calculation is completed, label allocation is performed on an FEC to the destination router R1 according to LDP. A non-destination router on the ring topology accepts a label allocated to the non-destination router by its optimal next hop, and the non-destination router allocates a local label to its upstream router. According to FIG. 1, R1 allocates a label L1 to its upstream routers R2 and R7. R2 accepts the label allocated by R1 and allocates a local label L2 to its upstream router R3, R3 accepts the label L2 allocated by R2 and continues to allocate a local label L3 to the upstream router R4, and R4 accepts the label L3 allocated by R3 and continues to allocate a label L4 to the upstream router R5. However, the label L4 allocated by R4 to R5 will not be accepted by R5, because the optimal next hop from R5 to the destination router R1 is R6 rather than R4. Therefore, R5 does not accept the label L4 allocated thereto by R4. Meanwhile, R5 does not allocate a local label to its downstream router R6, because a local label is sent to an upstream router only, and R6 is an downstream router of R5 rather than a upstream router of R5. Therefore, an LSP of R4→R3→R2→R1 is generated along a clockwise direction, and corresponding labels are L3→L2→L1. Accordingly, another LSP of R5→R6→R7→R1 is also generated along a counterclockwise direction, and corresponding labels are L6→L5→L1.

If a fault occurs on a link between R1 and R2, before the clockwise LSP (R4→R3→R2→R1) is dismantled, R4 still forwards a packet to R3 along the clockwise LSP, and then R3 forwards the packet to R2. However, after the packet arrives at R2, because of the link fault between R2 and R1, the packet is discarded. Such a packet loss process lasts until routers on the ring network achieve routing convergence and a brand new LSP of R2→R3→R4→R5→R6→R7→R1 is established. Generally, the entire packet loss process lasts for a few seconds, which is unacceptable for a mobile voice service.

In view of this, an embodiment of the present invention provides a method for generating a label forwarding table for a non-destination router on a ring topology. FIG. 2 is a flow chart of the method, and the method includes the following content.

202: The non-destination router receives a clockwise outgoing label actively allocated by its clockwise next-hop router on the ring topology, where the clockwise outgoing label takes a destination router on the ring topology as an endpoint of a clockwise label switching path (LSP) corresponding to the clockwise outgoing label. Preferably, the clockwise next-hop router on the ring topology allocates only one clockwise outgoing label to the non-destination router, where the label takes the destination router as the endpoint of the clockwise LSP. Preferably, the clockwise outgoing label is a label carried in an LSP packet sent by the non-destination router along a clockwise direction.

204: The non-destination router receives a counterclockwise outgoing label actively allocated by its counterclockwise next-hop router on the ring topology, where the counterclockwise outgoing label takes the destination router on the ring topology as an endpoint of a counterclockwise LSP corresponding to the counterclockwise outgoing label. Preferably, the counterclockwise next-hop router on the ring topology allocates only one counterclockwise outgoing label to the non-destination router, where the label takes the destination router as the endpoint of the counterclockwise LSP. Preferably, the counterclockwise outgoing label is a label carried in an LSP packet sent by the non-destination router along a counterclockwise direction.

206: The non-destination router actively allocates a clockwise incoming label of the non-destination router to its clockwise previous-hop router on the ring topology, where the clockwise incoming label takes the destination router as an endpoint of a clockwise LSP corresponding to the clockwise incoming label. Preferably, the non-destination router allocates only one clockwise incoming label of the non-destination router to its clockwise previous-hop router on the ring topology. Preferably, the clockwise incoming label is a label carried in an LSP packet received by the non-destination router along the clockwise direction.

208: The non-destination router actively allocates a counterclockwise incoming label of the non-destination router to its counterclockwise previous-hop router on the ring topology, where the counterclockwise incoming label takes the destination router as an endpoint of a counterclockwise LSP corresponding to the counterclockwise incoming label. Preferably, the non-destination router allocates only one counterclockwise incoming label of the non-destination router to its counterclockwise previous-hop router on the ring topology. Preferably, the counterclockwise incoming label is a label carried in an LSP packet received by the non-destination router along the counterclockwise direction.

210: The non-destination router generates a clockwise label forwarding table according to the clockwise incoming label allocated by the non-destination router itself and the clockwise outgoing label received by the non-destination router itself. The clockwise label forwarding table refers to a label forwarding table used for forwarding a data stream along the clockwise direction.

It can be understood that the clockwise label forwarding table of the non-destination router in step 210 is generated based on the clockwise incoming label allocated in step 206 and the clockwise outgoing label received in step 202.

212: The non-destination router generates a counterclockwise label forwarding table according to the counterclockwise incoming label allocated by the non-destination router itself and the counterclockwise outgoing label received by the non-destination router itself. The counterclockwise label forwarding table refers to a label forwarding table used for forwarding a data stream along the counterclockwise direction.

It may be understood that the counterclockwise label forwarding table of the non-destination router in step 212 is generated based on the counterclockwise incoming label allocated in step 208 and the counterclockwise outgoing label received in step 204.

Preferably, in this embodiment, a clockwise LSP is an LSP for sending an LSP packet or a data stream along the clockwise direction of the ring topology, and a counterclockwise LSP is an LSP for sending an LSP packet or a data stream along the counterclockwise direction of the ring topology.

Preferably, in this embodiment, the clockwise outgoing label of the non-destination router is a clockwise incoming label of its clockwise next-hop router.

The counterclockwise outgoing label of the non-destination router is a counterclockwise incoming label of its counterclockwise next-hop router.

The clockwise incoming label of the non-destination router is a clockwise outgoing label of its clockwise previous-hop router.

The counterclockwise incoming label of the non-destination router is a counterclockwise outgoing label of its counterclockwise previous-hop router.

Preferably, in this embodiment, in order to enable the non-destination router to not only receive the clockwise outgoing label allocated by its clockwise next-hop router on the ring topology, but also receive the counterclockwise outgoing label allocated by its counterclockwise next-hop router on the ring topology, a same FEC corresponding to both the clockwise label forwarding table and the counterclockwise label forwarding table may be configured on the non-destination router, so as to enable the non-destination router to receive both the clockwise outgoing label and the counterclockwise outgoing label, so that two label forwarding tables for different directions are generated subsequently.

Alternatively, in this embodiment, two FECs may be configured on the non-destination router. Each FEC corresponds to one label forwarding table, where one of the label forwarding tables is a clockwise label forwarding table, and the other label forwarding table is a counterclockwise label forwarding table. In this way, the non-destination router may also be enabled to receive the clockwise outgoing label and the counterclockwise outgoing label, so that two label forwarding tables for different directions are generated subsequently.

It should be noted that, in this embodiment, an active label allocating manner is adopted, that is, a downstream router actively allocates a label to its upstream router in a case of not receiving a request for label from its upstream router, and the downstream router also records the actively allocated label or mapping information in the actively allocated label.

For a specific destination router on the ring topology, each non-destination router receives labels which are actively allocated to it separately by its clockwise next-hop router and its counterclockwise next-hop router on the ring topology, and actively allocates labels to its clockwise previous-hop router and its counterclockwise previous-hop router separately. The former are outgoing labels of the non-destination router, and the latter are incoming labels of the non-destination router.

By executing, on each non-destination router on the ring topology, the method for generating the clockwise label forwarding table and the counterclockwise label forwarding table, a clockwise label forwarding table and a counterclockwise label forwarding table may be generated in each non-destination router. In this way, in the ring topology, a clockwise LSP and a counterclockwise LSP that take the destination router as an endpoint are automatically generated respectively, where the LSPs are LDP-based LSPs. In this way, for any non-destination router, one of the clockwise LSP and counterclockwise LSP is used as an active LSP, and the other is used as a standby LSP. Therefore, when one LSP is faulty, traffic can be switched over to the LSP in another direction immediately, thereby reducing packet loss.

For better understanding, a specific application scenario is introduced in the following.

Figure 3:
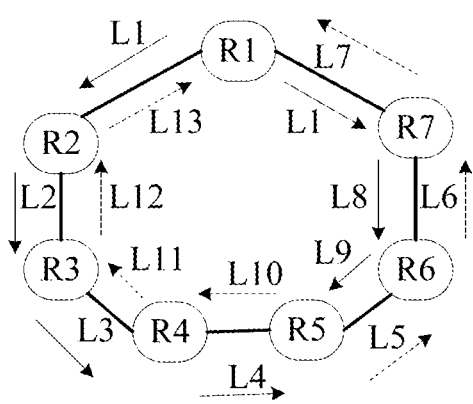
FIG. 3 illustrates a label allocating manner according to an embodiment of the present invention.

According to FIG. 3, seven routers, namely, R1 to R7, are arranged on a ring topology in a counterclockwise direction. It is assumed that R1 is a destination router, and the other routers R2 to R7 are non-destination routers.

The R4 router is taken as an example. In order to generate a clockwise label forwarding table and a counterclockwise label forwarding table on R4, R4 executes the following operations.

R4 receives a clockwise outgoing label L3 actively allocated to R4 by its clockwise next-hop router R3 on the ring topology, where L3 takes the destination router R1 on the ring topology as an endpoint of a label switching path (LSP) corresponding to the clockwise outgoing label L3. Preferably, R3 allocates only one clockwise outgoing label L3 to R4, where the label L3 takes the destination router R1 as the endpoint of the clockwise LSP.

R4 receives a counterclockwise outgoing label L10 actively allocated to R4 by its counterclockwise next-hop router R5 on the ring topology, where L10 takes the destination router R1 on the ring topology as an endpoint of an LSP corresponding to the counterclockwise outgoing label L10. Preferably, R5 allocates only one counterclockwise outgoing label L10 to R4, where the label L10 takes the destination router R1 as the endpoint of the counterclockwise LSP.

R4 actively allocates a clockwise incoming label L4 of R4 to its clockwise previous-hop router R5 on the ring topology, where L4 takes the destination router R1 as an endpoint of an LSP corresponding to the clockwise incoming label L4, and R5 takes L4 as a clockwise outgoing label of R5. Preferably, R4 allocates only one clockwise incoming label of R4 to its clockwise previous-hop router R5 on the ring topology.

R4 actively allocates a counterclockwise incoming label L11 of R4 to its counterclockwise previous-hop router R3 on the ring topology, where L11 takes the destination router R1 as an endpoint of an LSP corresponding to the counterclockwise incoming label L11, and R3 takes L11 as a counterclockwise outgoing label of R3. Preferably, R4 allocates only one counterclockwise incoming label of R4 to its counterclockwise previous-hop router R3 on the ring topology.

Therefore, R4 generates a clockwise label forwarding table according to the clockwise incoming label L4 allocated to R5 by R4 and the clockwise outgoing label L3 received from R3 by R4. Moreover, R4 generates a counterclockwise label forwarding table according to the counterclockwise incoming label L11 allocated to R3 by R4 itself and the counterclockwise outgoing label L10 received from R5 by R4 itself.

Preferably, in order to enable the non-destination router R4 to not only receive the clockwise outgoing label L3 allocated to it by its clockwise next-hop router R3 on the ring topology, but also receive the counterclockwise outgoing label L10 allocated to it by its counterclockwise next-hop router R5 on the ring topology, a same FEC corresponding to both the clockwise label forwarding table and the counterclockwise label forwarding table may be configured on R4, so as to enable R4 to receive the clockwise outgoing label L3 and the counterclockwise outgoing label L10.

Alternatively, two FECs may be configured on R4. Each FEC corresponds to one label forwarding table, where one of the label forwarding tables is the clockwise label forwarding table, and the other label forwarding table is the counterclockwise label forwarding table. In this way, R4 may also be enabled to receive the clockwise outgoing label L3 and the counterclockwise outgoing label L10.

Accordingly, operations with a same principle as that of generating the clockwise label forwarding table and the counterclockwise label forwarding table for R4 are executed on other non-destination routers R2, R3 and R5 to R7 on the ring topology in FIG. 3, and the clockwise label forwarding table and the counterclockwise label forwarding table may be generated for each non-destination router. Therefore, two LSPs to the destination router R1 along different ring directions may be generated on the ring direction, which are R7-R6-R5-R4-R3-R2-R1 and R2-R3-R4-R5-R6-R7-R1. For any non-destination router on the ring, two LSPs capable of reaching the destination router R1 exist. For example, for R4, two LSPs, namely R4-R3-R2-R1 and R4-R5-R6-R7-R1 exist; for R5, two LSPs, namely R5-R4-R3-R2-R1 and R5-R6-R7-R1 exist. For any non-destination router, one of its two LSPs reaching the destination router may be selected as an active LSP, and the other is selected as a standby LSP. Preferably, an LSP with a shorter distance to the destination router may be selected as an active LSP, and an LSP with a longer distance to the destination router may be selected as the standby LSP. Taking R4 for example, R4-R3-R2-R1 may be selected as the active LSP, and R4-R5-R6-R7-R1 is selected as the standby LSP.

When a link fault occurs on the ring network, a router which finds the fault may quickly switch traffic from an active LSP of the local router to a standby LSP, and transmits the traffic to the destination router through the standby LSP.

In order to more clearly illustrate how to reduce packet loss of a service during a fault in a case that active and standby LSPs are generated on the ring topology, forwarding table entries of each router on the ring topology are described with reference to FIG. 4 to FIG. 6.

Figure 4:
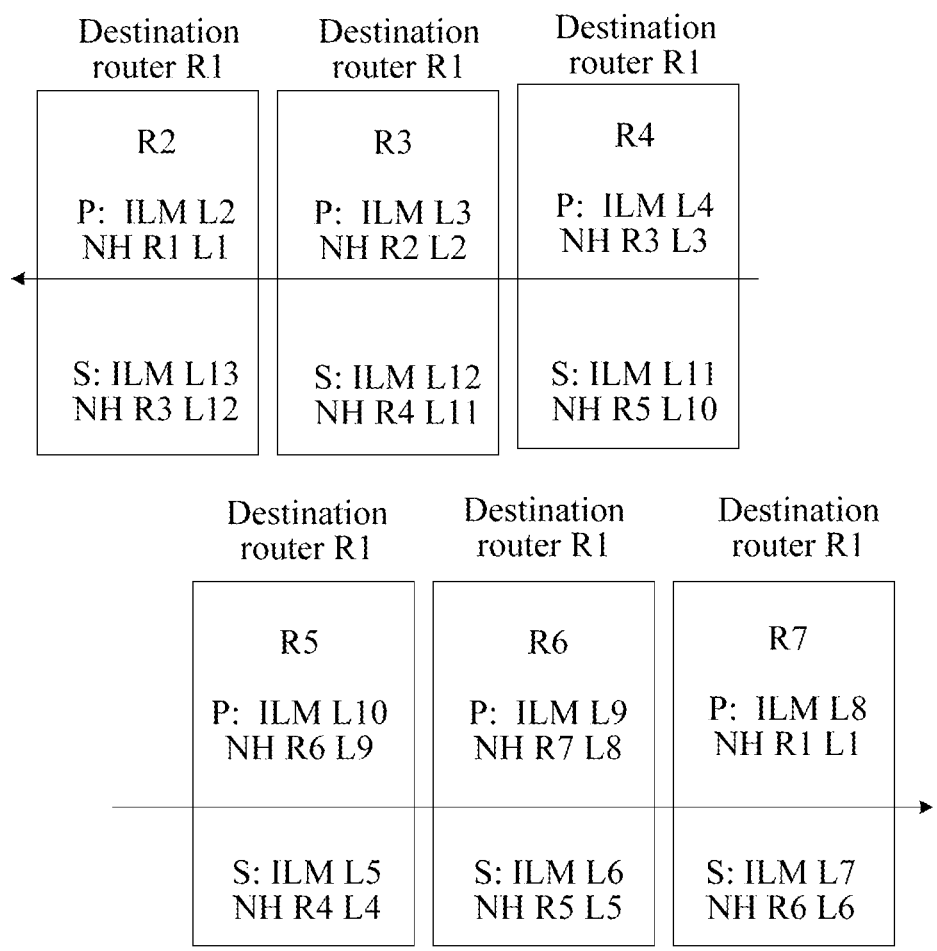
FIG. 4 shows a schematic diagram of forwarding table entries of each router on a ring topology when no link is faulty according to an embodiment of the present invention.

FIG. 4 shows forwarding table entries of each router when no link faulty occurs. In the following, the forwarding table entries on each non-destination router on the ring topology are illustrated by taking R4 as a router where traffic is inserted.

In FIG. 4, P represents an active LSP to a destination router R1, and S represents a standby LSP to the destination router R1. An arrow represents a forwarding path of a packet without any fault. NH represents a next hop, and two fields closely following NH represent a name of a next-hop router and a corresponding outgoing label, and a field following ILM represents an incoming label of each router on a corresponding LSP.

Figure 5:
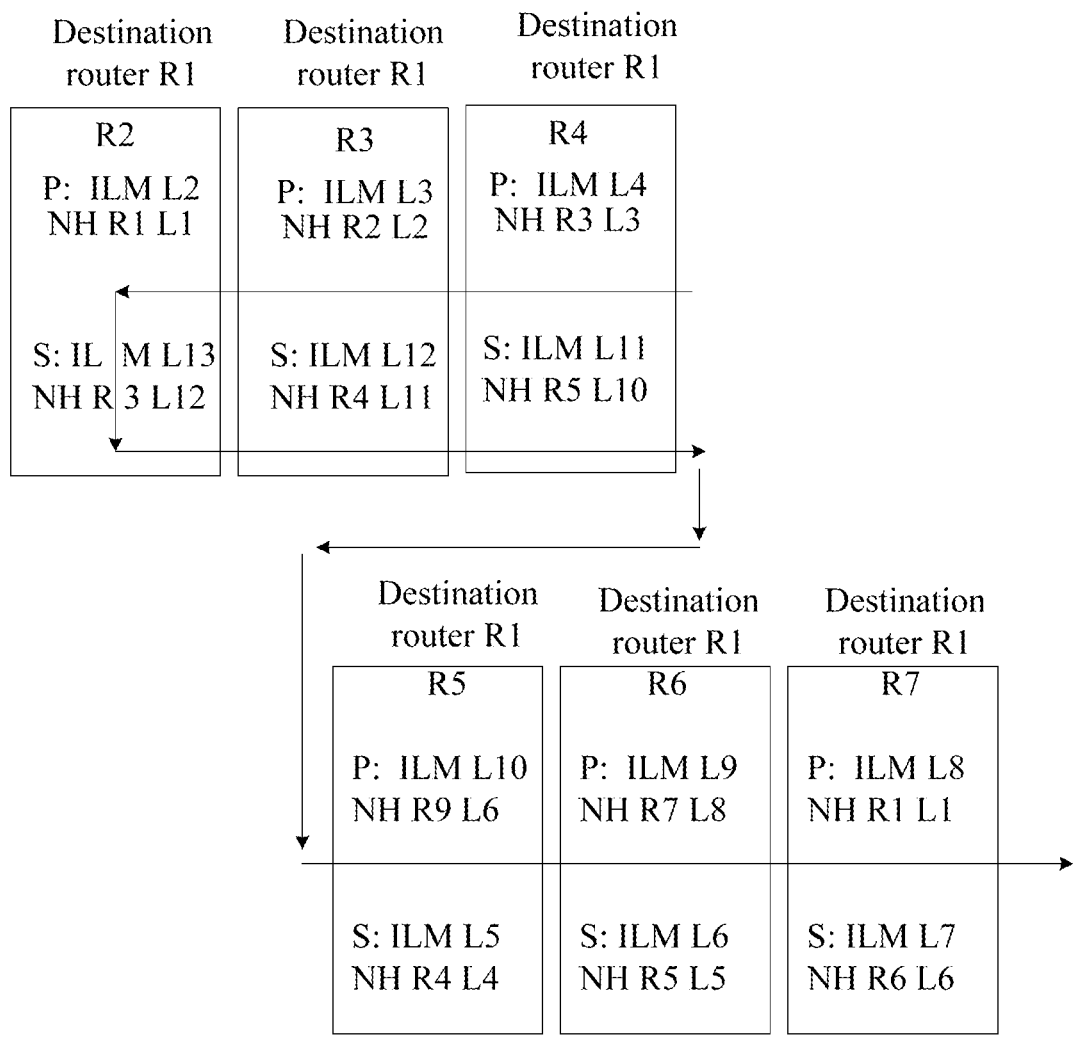
FIG. 5 shows a schematic diagram of forwarding table entries of each router on a ring topology during an active/standby LSP switchover of a router R2 according to an embodiment of the present invention.

FIG. 5 shows forwarding table entries of each router during an active/standby switchover of R2 in a case that a link fault occurs between R1 and R2. Referring to FIG. 5, if the fault occurs on a link between R1 and R2, before a clockwise LSP is dismantled, R4 still sends a packet to R3 along an active LSP (in a clockwise ring direction), and R3 sends the packet to R2. However, after the packet arrives at R2, R2 has already sensed the link fault between R1 and R2, and switchover from the active LSP to a standby LSP occurs on the R2 router. Traffic immediately turns around at the R2 router and turns to R3 at the next hop, the outgoing label is changed to L12, and then the traffic is forwarded to the destination router R1 along a counterclockwise standby LSP. In this way, packet loss of a mobile voice service is greatly reduced.

After routing convergence is achieved on the R2 router again, R2 dismantles a clockwise LSP. Once a clockwise LSP on R3 is dismantled, active/standby LSP switchover also occurs on R3.

Figure 6:
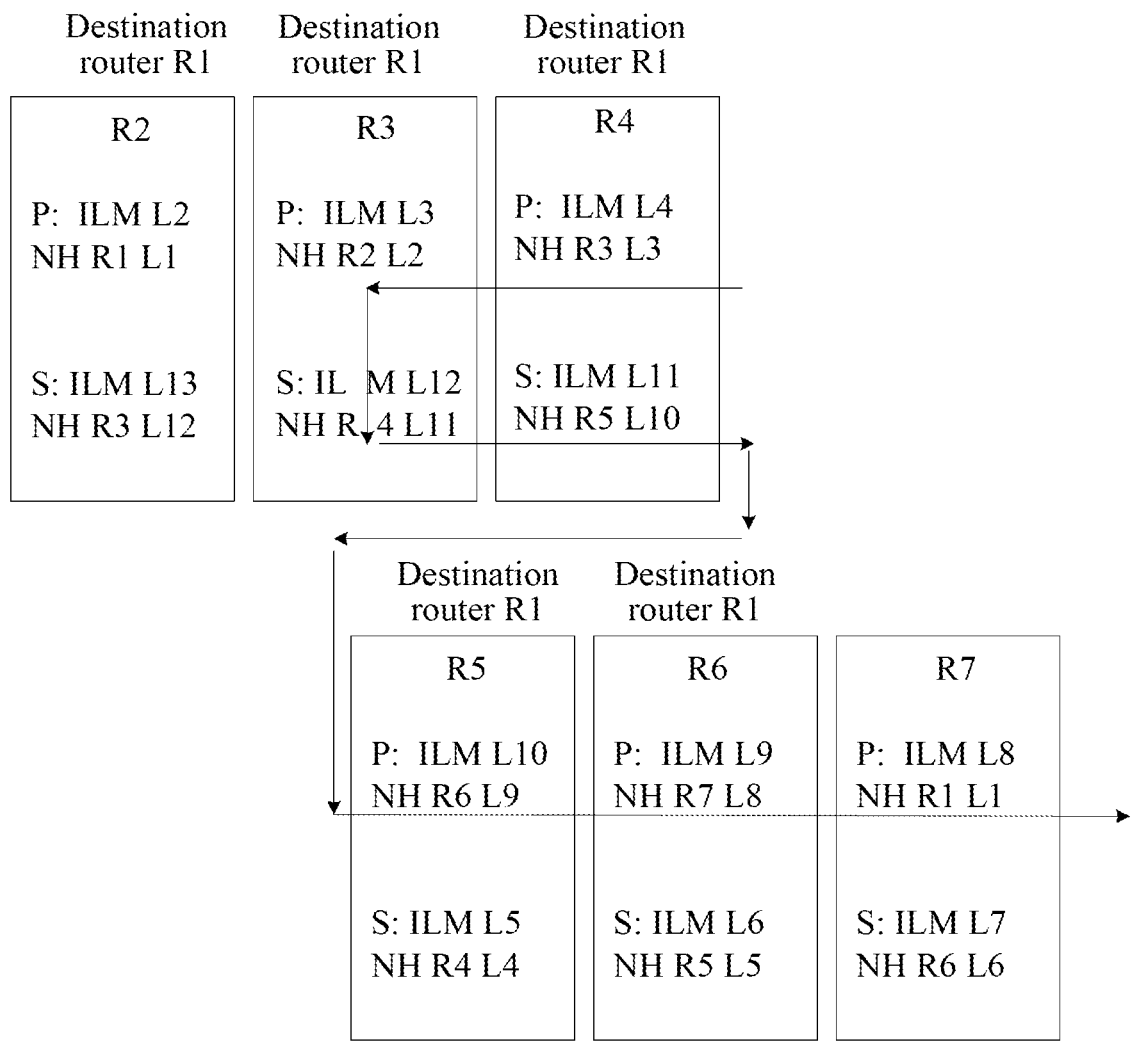
FIG. 6 shows a schematic diagram of forwarding table entries of each router on a ring topology during an active/standby LSP switchover of a router R3 according to an embodiment of the present invention.

FIG. 6 shows forwarding table entries of each router during active/standby LSP switchover on R3. Referring to FIG. 6, traffic inserted at the R4 router turns around at the R3 router and turns to R4 at the next hop, the outgoing label is changed to L11, and the traffic is forwarded to the destination router R1 along a counterclockwise standby LSP.

Figure 7:
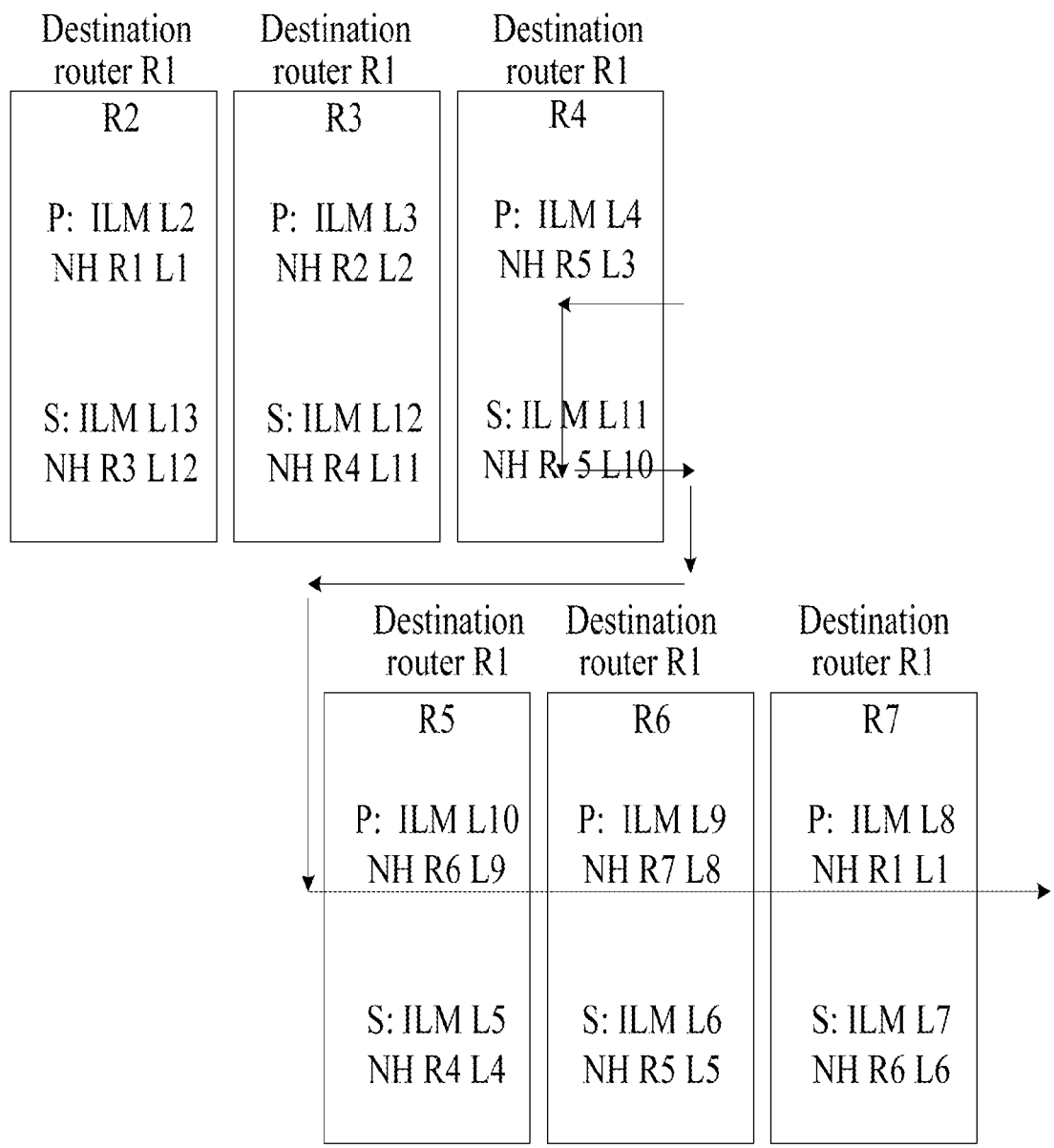
FIG. 7 shows a schematic diagram of forwarding table entries of each router on a ring topology during an active/standby LSP switchover of a router R4 according to an embodiment of the present invention.

FIG. 7 shows forwarding table entries of each router during active/standby LSP switchover on R4. Referring to FIG. 7, once the clockwise active LSP on R4 is dismantled, switchover from an active LSP to a standby LSP also occurs on R4. Traffic inserted at the R4 router directly turns round at the R4 router and turns to R5 at the next hop, the outgoing label is changed to L10, and the traffic is forwarded to the destination router R1 along a counterclockwise LSP.

For traffic inserted at the R5, R6 or R7 router, when a fault occurs in the link between R1 and R2, because active LSPs from R5, R6 and R7 to the destination router R1 are counterclockwise, forwarding paths of the traffic inserted at these routers remain unchanged, and the traffic is still forwarded to the destination router R1 along the counterclockwise LSPs.

Figure 8:
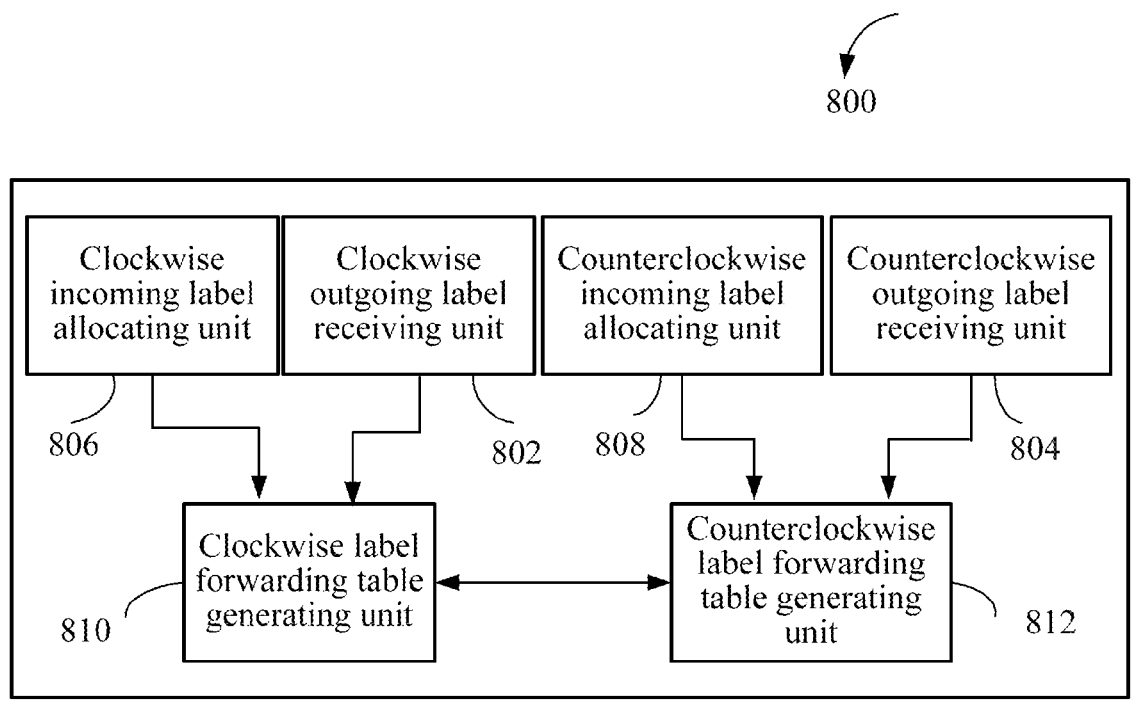
FIG. 8 shows a structural diagram of an apparatus for generating a label forwarding table for a non-destination router on a ring topology according to an embodiment of the present invention.

FIG. 8 is a structural diagram of an apparatus for generating a label forwarding table for a non-destination router on a ring topology according to an embodiment of the present invention. The ring topology includes one destination router and multiple non-destination routers. The apparatus is included in one of the multiple non-destination routers, and the apparatus includes the following content.

A clockwise outgoing label receiving unit 802 is configured to receive a clockwise outgoing label actively allocated by a clockwise next-hop router of a non-destination router where the apparatus is located on the ring topology, where the clockwise outgoing label takes the destination router on the ring topology as an endpoint of a clockwise label switching path LSP corresponding to the clockwise outgoing label, the clockwise next-hop router on the ring topology allocates only one clockwise outgoing label to the non-destination router where the apparatus is located, and the label takes the destination router as the endpoint of the clockwise LSP.

A counterclockwise outgoing label receiving unit 804 is configured to receive a counterclockwise outgoing label actively allocated by a counterclockwise next-hop router of the non-destination router where the apparatus is located on the ring topology, where the counterclockwise outgoing label takes the destination router on the ring topology as an endpoint of a counterclockwise LSP corresponding to the counterclockwise outgoing label, and the counterclockwise next-hop router on the ring topology allocates only one counterclockwise outgoing label to the non-destination router where the apparatus is located, and the label takes the destination router as the endpoint of the counterclockwise LSP.

A clockwise incoming label allocating unit 806 is configured to actively allocate a clockwise incoming label of the non-destination router, where the apparatus is located, to a clockwise previous-hop router of the non-destination router where the apparatus is located on the ring topology, where the clockwise incoming label takes the destination router as an endpoint of a clockwise LSP corresponding to the clockwise incoming label, and the clockwise incoming label allocating unit 806 allocates only one clockwise incoming label of the non-destination router, where the apparatus is located, to the clockwise previous-hop router of the non-destination router where the apparatus is located on the ring topology.

A counterclockwise incoming label allocating unit 808 is configured to actively allocate a counterclockwise incoming label of the non-destination router, where the apparatus is located, to a counterclockwise previous-hop router of the non-destination router where the apparatus is located on the ring topology, where the counterclockwise incoming label takes the destination router as an endpoint of a counterclockwise LSP corresponding to the counterclockwise incoming label, and the counterclockwise incoming label allocating unit 808 allocates only one counterclockwise incoming label of the non-destination router, where the apparatus is located, to the counterclockwise previous-hop router of the non-destination router where the apparatus is located on the ring topology.

A clockwise label forwarding table generating unit 810 is configured to generate a clockwise label forwarding table according to the clockwise incoming label allocated by the clockwise incoming label allocating unit 806 and the clockwise outgoing label received by the clockwise outgoing label receiving unit 802.

A counterclockwise label forwarding table generating unit 812 is configured to generate a counterclockwise label forwarding table according to the counterclockwise incoming label allocated by the counterclockwise incoming label allocating unit 808 and the counterclockwise outgoing label received by the counterclockwise outgoing label receiving unit 804.

Each component unit in the apparatus may be hardware, software or a combination of the two.

Preferably, in the embodiment shown in FIG. 8, the clockwise outgoing label of the non-destination router is a clockwise incoming label of its clockwise next-hop router.

The counterclockwise outgoing label of the non-destination router is a counterclockwise incoming label of its counterclockwise next-hop router.

The clockwise incoming label of the non-destination router is a clockwise outgoing label of its clockwise previous-hop router.

The counterclockwise incoming label of the non-destination router is a counterclockwise outgoing label of its counterclockwise previous-hop router.

Figure 9:
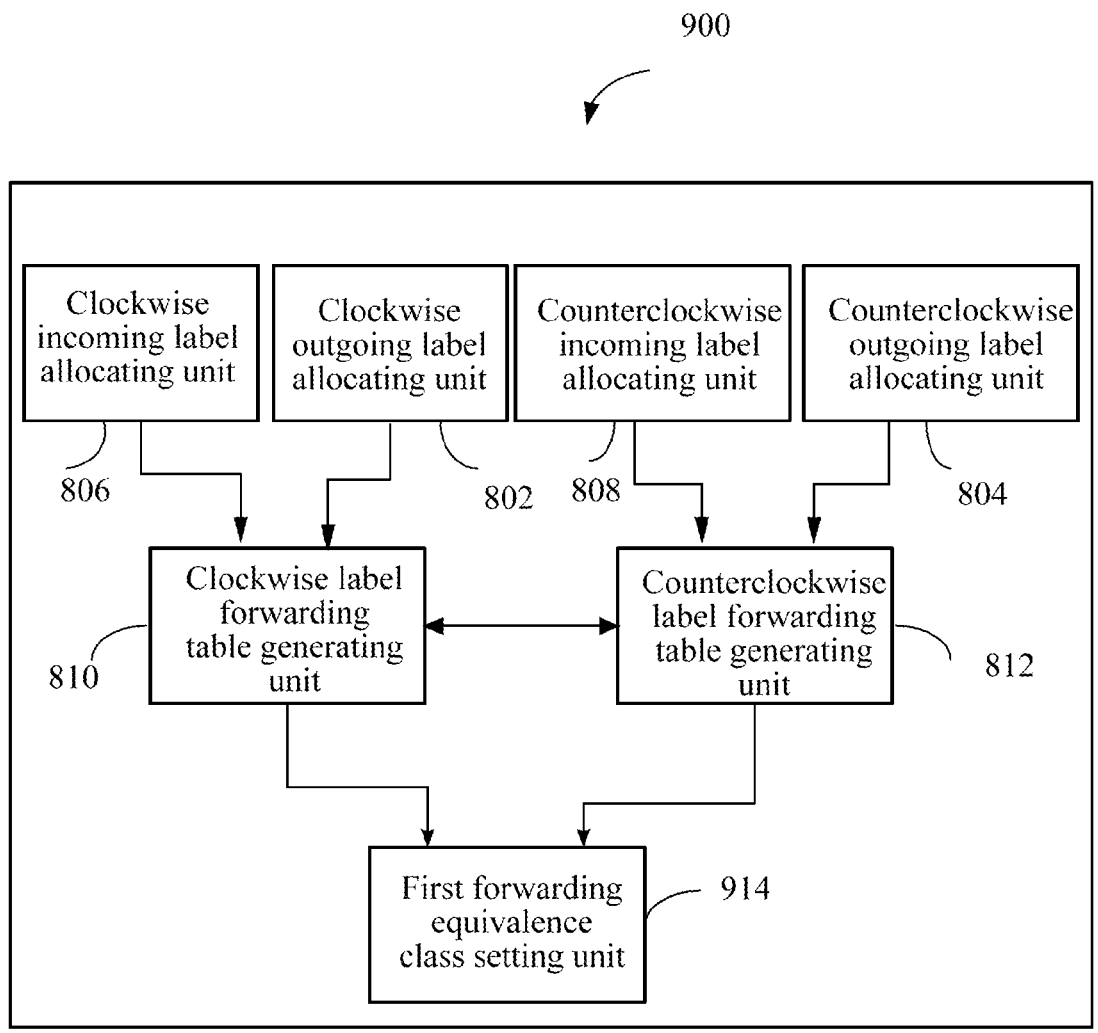
FIG. 9 shows a structural diagram of an apparatus for generating a label forwarding table for a non-destination router on a ring topology according to another embodiment of the present invention.

Optionally, as shown in FIG. 9, the apparatus shown in FIG. 8 may further include:

a first forwarding equivalence class setting unit 914, configured to set a forwarding equivalence class (FEC), so that the FEC corresponds to both the clockwise label forwarding table of the non-destination router where the apparatus is located and the counterclockwise label forwarding table of the non-destination router where the apparatus is located.

Figure 10:
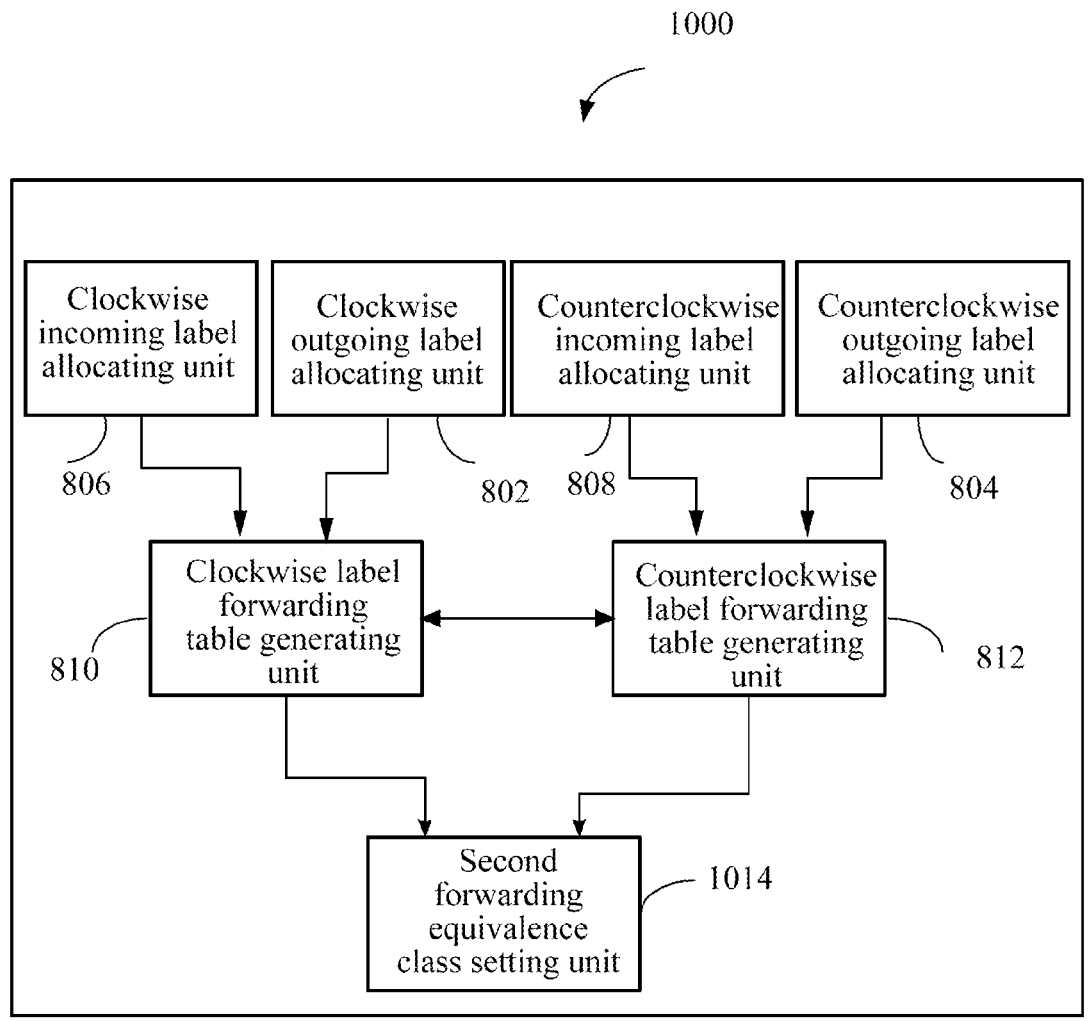
FIG. 10 shows a structural diagram of an apparatus for generating a label forwarding table for a non-destination router on a ring topology according to another embodiment of the present invention.

Alternatively, optionally, as shown in FIG. 10, the apparatus shown in FIG. 8 may further include:

a second forwarding equivalence class setting unit 1014, configured to set two FECs, so that one of the FECs corresponds to the clockwise label forwarding table of the non-destination router where the apparatus is located, and the other FEC corresponds to the counterclockwise label forwarding table of the non-destination router where the apparatus is located.

Figure 11:
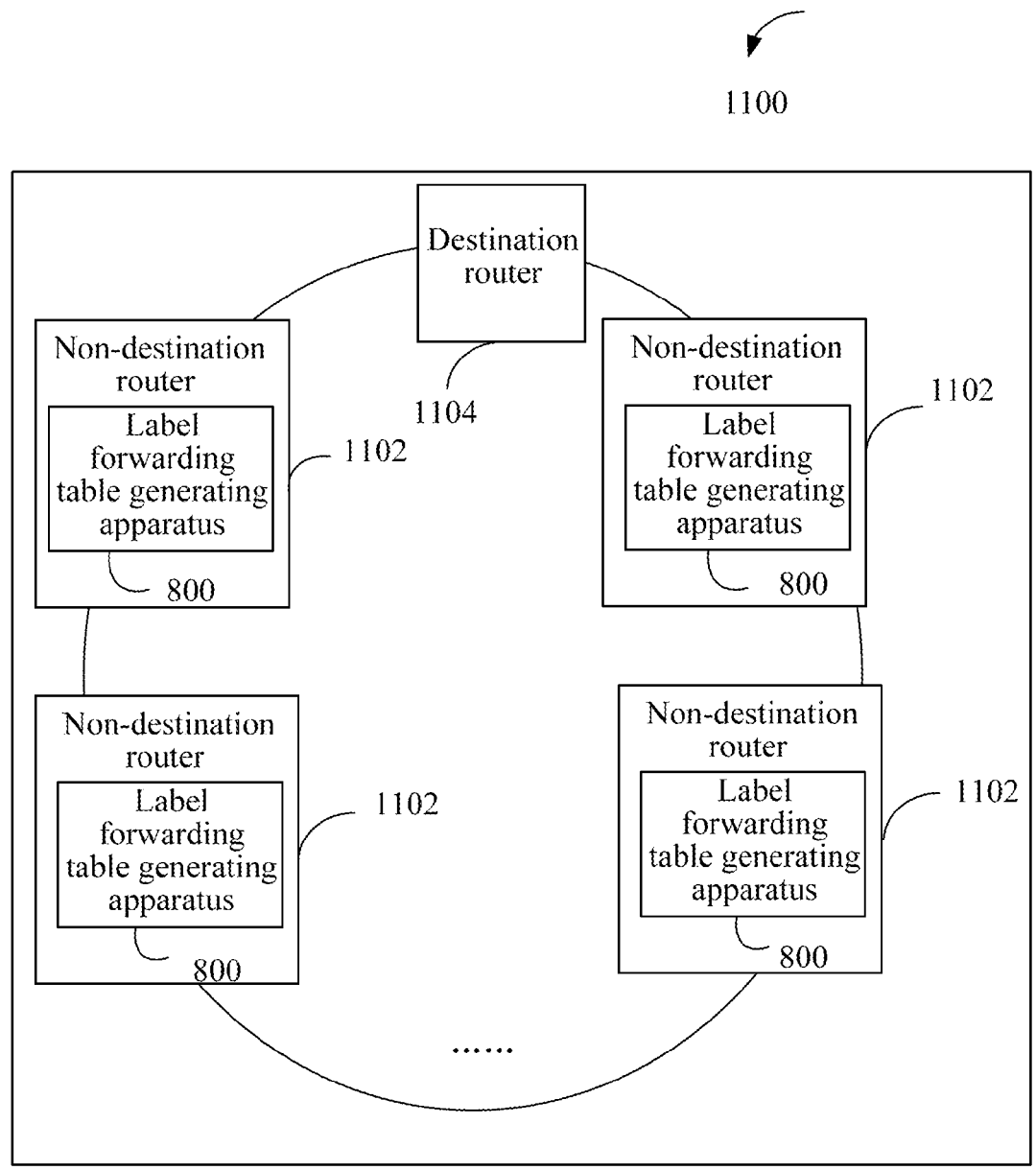
FIG. 11 shows a schematic diagram of a system for generating two label switching paths LSPs of different ring directions on a ring topology according to an embodiment of the present invention.

In some embodiments of the present invention, each non-destination router on the ring topology has an apparatus for generating label forwarding table shown in FIG. 8, FIG. 9 or FIG. 10. FIG. 11 shows a system for generating two label switching paths LSPs of different ring directions on a ring topology. The system includes multiple non-destination routers 1102 and one destination router 1104, and each non-destination router 1102 includes one apparatus for generating a label forwarding table 800.

Various exemplary logic blocks, units, circuits, elements and/or components illustrated with reference to the embodiments disclosed in this document may be implemented or executed through a general processor, a digital signal processor (DSP), an application specific integrated circuit (ASIC), a field programmable gate array (FPGA) or other programmable logic components, a discrete gate or transistor logic, a discrete hardware component, or any of their combinations designed for executing the function described in this document. The general processor may be a microprocessor. As an alternative, the processor may also be any regular processor, controller, microcontroller or state machine. The processor may also be implemented as a combination of computation components, for example, a combination of a DSP and a microprocessor, a combination of multiple microprocessors, a combination of one or more microprocessors and a DSP core, or any other configuration of this kind.

Persons of ordinary skill in the art may understand that all or part of the steps of the method in the foregoing embodiments may be implemented by a program instructing relevant hardware. The program may be stored in a computer readable storage medium, and the storage medium may be a read-only memory, a magnetic disk, an optical disk, or the like.

the method for generating a label forwarding table for a non-destination router on a ring topology, the method for generating two label switching paths LSPs of different ring directions on a ring topology, the apparatus for generating a label forwarding table for a non-destination router on a ring topology, and the system for generating two label switching paths LSPs of different ring directions on a ring topology which are provided by the present invention are introduced above in detail. Persons of ordinary skill in the art may make variations in terms of the specific implementations and application scopes according to the ideas of the embodiments of the present invention. Therefore, the content of this specification shall not be construed as a limitation to the present invention.

What is claimed is:

1. A method for generating a label forwarding table for a non-destination router on a ring topology, wherein the method comprises:

receiving, by a non-destination router, a clockwise outgoing label actively allocated by its clockwise next-hop router on a ring topology, wherein the clockwise outgoing label takes a destination router on the ring topology as an endpoint of a clockwise label switching path (LSP) corresponding to the clockwise outgoing label, the clockwise next-hop router on the ring topology allocates only one clockwise outgoing label to the non-destination router, and the label takes the destination router as the endpoint of the clockwise LSP;

receiving, by the non-destination router, a counterclockwise outgoing label actively allocated by its counterclockwise next-hop router on the ring topology, wherein the counterclockwise outgoing label takes the destination router on the ring topology as an endpoint of a counterclockwise LSP corresponding to the counterclockwise outgoing label, the counterclockwise next-hop router on the ring topology allocates only one counterclockwise outgoing label to the non-destination router, and the label takes the destination router as the endpoint of the counterclockwise LSP;

actively allocating, by the non-destination router, a clockwise incoming label of the non-destination router to its clockwise previous-hop router on the ring topology, wherein the clockwise incoming label takes the destination router as an endpoint of a clockwise LSP corresponding to the clockwise incoming label, and the non-destination router allocates only one clockwise incoming label of the non-destination router to its clockwise previous-hop router on the ring topology;

actively allocating, by the non-destination router, a counterclockwise incoming label of the non-destination router to its counterclockwise previous-hop router on the ring topology, wherein the counterclockwise incoming label takes the destination router as an endpoint of a counterclockwise LSP corresponding to the counterclockwise incoming label, and the non-destination router allocates only one counterclockwise incoming label of the non-destination router to its counterclockwise previous-hop router on the ring topology;

generating, by the non-destination router, a clockwise label forwarding table according to the clockwise incoming label allocated by the non-destination router itself and the clockwise outgoing label received by the non-destination router itself; and generating, by the non-destination router, a counterclockwise label forwarding table according to the counterclockwise incoming label allocated by the non-destination router itself and the counterclockwise outgoing label received by the non-destination router itself.

2. The method according to claim 1, wherein the clockwise outgoing label of the non-destination router is a clockwise incoming label of its clockwise next-hop router;

the counterclockwise outgoing label of the non-destination router is a counterclockwise incoming label of its counterclockwise next-hop router;

the clockwise incoming label of the non-destination router is a clockwise outgoing label of its clockwise previous-hop router; and the counterclockwise incoming label of the non-destination router is a counterclockwise outgoing label of its counterclockwise previous-hop router.

3. The method according to claim 1, wherein the method further comprises:

configuring a forwarding equivalence class (FEC), so that the FEC corresponds to both the clockwise label forwarding table of the non-destination router and the counterclockwise label forwarding table of the non-destination router.

4. The method according to claim 1, wherein the method further comprises:

configuring two forwarding equivalence classes (FECs), so that one of the FECs corresponds to the clockwise label forwarding table of the non-destination router, and the other FEC corresponds to the counterclockwise label forwarding table of the non-destination router.

5. A method for generating two label switching paths LSPs of different ring directions on a ring topology, wherein the method comprises:

executing, by each non-destination router on a ring topology, a method according to claim 1, to generate its own clockwise label forwarding table and counterclockwise label forwarding table on each non-destination router, so as to generate a clockwise LSP and a counterclockwise LSP in the ring topology and according to the clockwise label forwarding table and the counterclockwise label forwarding table of each non-destination router in the ring topology, respectively, wherein the clockwise LSP and the counterclockwise LSP take a destination router as endpoints, and for any non-destination router, one of the clockwise LSP and the counterclockwise LSP is an active LSP, and the other is a standby LSP.

6. An apparatus for generating a label forwarding table for a non-destination router on a ring topology, wherein a ring topology comprises one destination router and multiple non-destination routers, and the apparatus comprises:

a clockwise outgoing label receiving unit configured to receive a clockwise outgoing label actively allocated by a clockwise next-hop router of a non-destination router where the apparatus is located on the ring topology, wherein the clockwise outgoing label takes the one destination router on the ring topology as an endpoint of a clockwise label switching path LSP corresponding to the clockwise outgoing label, the clockwise next-hop router on the ring topology allocates only one clockwise outgoing label to the non-destination router where the apparatus is located, and the label takes the destination router as the endpoint of the clockwise LSP;

a counterclockwise outgoing label receiving unit configured to receive a counterclockwise outgoing label actively allocated by a counterclockwise next-hop router of the non-destination router where the apparatus is located on the ring topology, wherein the counterclockwise outgoing label takes the destination router on the ring topology as an endpoint of a counterclockwise LSP corresponding to the counterclockwise outgoing label, and the counterclockwise next-hop router on the ring topology allocates only one counterclockwise outgoing label to the non-destination router where the apparatus is located, and the label takes the destination router as the endpoint of the counterclockwise LSP;

a clockwise incoming label allocating unit configured to actively allocate a clockwise incoming label of the non-destination router, where the apparatus is located, to a clockwise previous-hop router of the non-destination router where the apparatus is located on the ring topology, wherein the clockwise incoming label takes the destination router as an endpoint of a clockwise LSP corresponding to the clockwise incoming label, and the clockwise incoming label allocating unit allocates only one clockwise incoming label of the non-destination router where the apparatus is located, to the clockwise previous-hop router of the non-destination router where the apparatus is located on the ring topology;

a counterclockwise incoming label allocating unit configured to actively allocate a counterclockwise incoming label of the non-destination router, where the apparatus is located, to a counterclockwise previous-hop router of the non-destination router where the apparatus is located on the ring topology, wherein the counterclockwise incoming label takes the destination router as an endpoint of a counterclockwise LSP corresponding to the counterclockwise incoming label, and the counterclockwise incoming label allocating unit allocates only one counterclockwise incoming label of the non-destination router, where the apparatus is located, to the counterclockwise previous-hop router of the non-destination router where the apparatus is located on the ring topology;

a clockwise label forwarding table generating unit configured to generate a clockwise label forwarding table according to the clockwise incoming label allocated by the clockwise incoming label allocating unit and the clockwise outgoing label received by the clockwise outgoing label receiving unit; and a counterclockwise label forwarding table generating unit, configured to generate a counterclockwise label forwarding table according to the counterclockwise incoming label allocated by the counterclockwise incoming label allocating unit and the counterclockwise outgoing label received by the counterclockwise outgoing label receiving unit.

7. The apparatus according to claim 6, wherein the apparatus further comprises:
   a first FEC setting unit configured to set a forwarding equivalence class (FEC) so that the FEC corresponds to both the clockwise label forwarding table of the non-destination router where the apparatus is located and the counterclockwise label forwarding table of the non-destination router where the apparatus is located.

8. The apparatus according to claim 6, wherein the apparatus further comprises:
   a second FEC setting unit configured to set two forwarding equivalence classes (FECs) so that one FEC corresponds to the clockwise label forwarding table of the non-destination router where the apparatus is located, and the other FEC corresponds to the counterclockwise label forwarding table of the non-destination router where the apparatus is located.

9. A ring network system, wherein the system comprises: one destination router and multiple non-destination routers, wherein each non-destination router on the ring topology comprises an apparatus according to claim 8.

* * * * *